US006402916B1

(12) United States Patent
Sampson et al.

(10) Patent No.: US 6,402,916 B1
(45) Date of Patent: Jun. 11, 2002

(54) ELECTROLYTIC PROCESS AND APPARATUS CONTROLLED REGENERATION OF MODIFIED ION EXCHANGERS TO PURIFY AQUEOUS SOLUTIONS AND ADJUST PH

(76) Inventors: Richard L. Sampson; Allison H. Sampson, both of 304 Bishop Ave., Bridgeport, CT (US) 06610

( * ) Notice: Subject to any disclaimer, the term of this patent is extended or adjusted under 35 U.S.C. 154(b) by 0 days.

(21) Appl. No.: 09/502,796

(22) Filed: Feb. 11, 2000

Related U.S. Application Data (63) Continuation-in-part of application No. 08/815,371, filed on Mar. 10, 1997, now Pat. No. 6,024,850, and a continuation-in-part of application No. 08/639,756, filed on Apr. 29, 1996, now Pat. No. 5,705,050, which is a continuation-in-part of application No. 08/400,950, filed on Mar. 9, 1995, now Pat. No. 5,609,742, which is a continuation-in-part of application No. 08/141,675, filed on Oct. 27, 1993, now Pat. No. 5,419,816.

(51) Int. Cl.[7] ................................................ C02F 1/469
(52) U.S. Cl. ........................ 204/524; 204/533; 204/536; 521/25
(58) Field of Search ................................ 204/524, 533, 204/536, 252, 632; 205/703, 748; 521/25, 26, 27

(56) References Cited

U.S. PATENT DOCUMENTS

| 2,428,329 A | 9/1947 | Ham et al. ................... 204/180 |
| 2,681,319 A | 6/1954 | Bodamer ..................... 260/2.1 |
| 2,681,320 A | 6/1954 | Bodamer ..................... 260/2.2 |

(List continued on next page.)

FOREIGN PATENT DOCUMENTS

| AU | 57 658/80 | 2/1981 |
| AU | 686234 | 2/1998 |
| EP | 0 005 569 | 11/1979 |

(List continued on next page.)

OTHER PUBLICATIONS

Tison, Richard P., Electrochemical Metals Recovery From Dilute Solutions Using Ion–Exchange Material, pp. 114–118, May 1998.
White, Geo, Clifford, On–Site Generation of Chlorine, The Handbook of Chlorination, Second Edition, 1986, Van Nostrand Reinhold, pp. 120–149.
Water Treatment Handbook, Sixth Edition, 1991, Lavoisier Publishing, vol. 1, Chapter 8, Regulations.
Newman, Electrochemical Systems, Second Edition, Prentice Hall, pp. 502–506.
Pletcher, Derek and Walsh, Frank C., Industrial Electrochemistry, Second Edition, Chapman and Hall Publishing 1990, pp. 160–167; 278–286 and 342–357 Helfferich, Friedrich, Ion Exchange, McGraw Hill Book Company, pp. 58–59, 1962.

Primary Examiner—Kathryn Gorgos
Assistant Examiner—Thomas H Parsons
(74) Attorney, Agent, or Firm—Cantor Colburn LLP (57) ABSTRACT

An electrolytic process and apparatus are disclosed for water purification and pH adjustment. The electrolytic reactor includes an anode, cathode and a bed of particulate ion exchange material modified by converting a portion of the transfer sites to semiconductor junctions. The ion exchange material may be a monobed of either modified anion exchange material or modified cation exchange material, or a mixed bed of both. Undesirable ions are exchanged onto the ion exchange material at the ion exchange sites. Regenerant ions, produced at the semiconductor junctions then exchange with the undesirable ions attached to the ion exchange material, and the undesirable ions migrate through the bed toward the respective anode or cathode and out of the aqueous solution. The pH of the aqueous solution can be adjusted by passing the solution through either a modified cation resin bed or through a modified anion resin bed to lower or increase the pH, respectively.

46 Claims, 9 Drawing Sheets

U.S. PATENT DOCUMENTS

| | | | |
|---|---|---|---|
| 2,794,777 A | 6/1957 | Pearson | 204/151 |
| 3,074,863 A | 1/1963 | Jasionowski | 204/151 |
| 3,149,061 A | 9/1964 | Parsi | 204/180 |
| 3,764,499 A | 10/1973 | Okubo et al. | 204/151 |
| 3,766,034 A | 10/1973 | Veltman | 204/149 |
| 3,873,668 A | 3/1975 | Melby | 423/24 |
| 4,004,994 A | 1/1977 | Andrus | 204/149 |
| 4,013,554 A | 3/1977 | Reis et al. | 210/40 |
| 4,073,752 A | 2/1978 | Ramp | 260/2.1 R |
| 4,159,235 A | 6/1979 | Kammel et al. | 204/272 |
| 4,165,273 A | 8/1979 | Azarov et al. | 204/301 |
| 4,221,712 A | 9/1980 | Makowski et al. | 260/23.5 A |
| 4,299,675 A | 11/1981 | Korach | 204/98 |
| 4,326,935 A | 4/1982 | Moeglich | 204/180 P |
| 4,356,068 A | 10/1982 | Darlington | 204/98 |
| 4,361,601 A | 11/1982 | Hillman et al. | 427/123 |
| 4,369,103 A | 1/1983 | White | 204/252 |
| 4,389,297 A | 6/1983 | Korach | 204/252 |
| 4,402,809 A | 9/1983 | Dilmore et al. | 204/254 |
| 4,472,252 A | 9/1984 | DeLue | 204/59 R |
| 4,521,283 A | 6/1985 | Pickens | 204/59 R |
| 4,596,641 A | 6/1986 | Bridger et al. | 204/151 |
| 4,636,286 A | 1/1987 | DeLue et al. | 204/59 R |
| 4,636,296 A | 1/1987 | Kunz | 204/182.5 |
| 4,640,945 A | 2/1987 | Peiffer et al. | 523/336 |
| 4,670,360 A | 6/1987 | Habermann et al. | 429/33 |
| 4,683,039 A | 7/1987 | Twardowski et al. | 204/95 |
| 4,758,319 A | 7/1988 | Klinkowski | 204/182.3 |
| 4,786,384 A | 11/1988 | Gerhardt et al. | 204/149 |
| 4,806,215 A | 2/1989 | Twardowski | 204/98 |
| 4,882,018 A | 11/1989 | Tison | 204/105 R |
| 4,983,267 A | 1/1991 | Moeglich et al. | 204/182.4 |
| 5,026,465 A | 6/1991 | Katz et al. | 204/182.4 |
| 5,084,148 A | 1/1992 | Kazcur et al. | 204/95 |
| 5,106,465 A | 4/1992 | Kaczur et al. | 204/98 |
| 5,108,560 A | 4/1992 | Cawlfield et al. | 204/103 |
| 5,122,240 A | 6/1992 | Cowley et al. | 204/101 |
| 5,141,966 A | 8/1992 | Porath | 521/32 |
| 5,183,565 A | 2/1993 | Zimmermann et al. | 210/269 |
| 5,192,446 A | 3/1993 | Salem et al. | 210/685 |
| 5,198,080 A | 3/1993 | Cowley et al. | 204/101 |
| 5,256,264 A | 10/1993 | Hundenborn et al. | 204/149 |
| 5,419,816 A | 5/1995 | Sampson et al. | 204/59 R |
| 5,609,742 A | 3/1997 | Sampson et al. | 204/536 |
| 5,705,050 A | 1/1998 | Sampson et al. | 205/687 |
| 6,024,850 A | 2/2000 | Sampson et al. | 204/296 |
| 6,203,688 B1 | 3/2001 | Lipsztajn et al. | 205/556 |

FOREIGN PATENT DOCUMENTS

| | | |
|---|---|---|
| EP | 0 104 911 | 4/1984 |
| EP | 0 422 453 | 4/1991 |
| EP | 0 650 929 | 5/1995 |
| GB | 568450 | 4/1945 |
| GB | 702316 | 1/1954 |
| GB | 787296 | 12/1957 |
| GB | 2 017 715 | 10/1979 |
| GB | 2 051 865 | 1/1981 |
| GB | 1 585 390 | 3/1981 |
| GB | 2 283 249 | 5/1995 |
| GB | 2 315 270 | 1/1998 |
| SU | 819066 | 5/1991 |
| WO | 90/15659 | 12/1990 |
| WO | 95/32791 | 12/1995 |

ELECTROLYTIC PROCESS AND APPARATUS CONTROLLED REGENERATION OF MODIFIED ION EXCHANGERS TO PURIFY AQUEOUS SOLUTIONS AND ADJUST PH

RELATED APPLICATIONS

This application is a continuation-in-part of our U.S. application, Ser. No. 08/815,371, filed Mar. 10, 1997, now U.S. Pat. No. 6,024,850, the disclosure of which is incorporated herein by reference for all purposes as if fully set forth, which was a continuation-in-part of our earlier application, Ser. No. 08/400,950, filed Mar. 9, 1995, now U.S. Pat. No. 5,609,742, which was a continuation-in-part of our earlier application, Ser. No. 08/141,675, filed Oct. 27, 1993, now U.S. Pat. No. 5,419,816 and a continuation-in-part of our earlier application, Ser. No. 08/639,756, filed Apr. 29, 1996, now U.S. Pat. No. 5,705,050.

BACKGROUND OF THE INVENTION

1. Field of the Invention

This invention relates to the controlled regeneration of ion exchangers for the purification and pH adjustment of aqueous solutions using an electrolytic reactor containing a modified ion exchange material for electrolytically splitting the water and generating free radical hydroxyl, free radical hydrogen, regenerant hydroxyl ion and/or regenerant hydrogen ion.

2. Description of the Related Art

As disclosed in Sampson U.S. Pat. Nos. 5,419,816 and 5,609,742, a modified ion exchange material, modified to have both semiconductor junctions and transfer sites, can be used to oxidize or reduce inorganic and organic species in an electrolytic reactor containing the modified ion exchange material. For oxidation, the ion exchange material is a cation exchange material, and the modified cation exchange material is placed in direct contact with at least one anode. When an aqueous solution containing an inorganic or organic species contacts the modified cation exchange material in the presence of a DC current, free radical hydroxyl and hydrogen ion are produced at the semiconductor junctions, and the inorganic or organic species is oxidized. If no species is present to be oxidized, the free radical hydroxyl decomposes to hydroxyl ion.

For reduction, the ion exchange material is an anion exchange material, and the modified anion exchange material is placed in direct contact with at least one cathode. When an aqueous solution containing an inorganic or organic species contacts the modified anion exchange material in the presence of a DC current, free radical hydrogen and hydroxyl ion are produced at the semiconductor junctions, and the inorganic or organic species is reduced. If no species is present to be reduced, the free radical hydrogen decomposes to hydrogen ion.

In a third Sampson patent, U.S. Pat. No. 5,705,050 discloses that if the DC current is operated in a bipolar fashion, the oxidation or reduction efficiency is improved.

Beyond oxidation and reduction, water can be purified electrochemically by such processes as empty-cell and filled-cell electrodialysis. Electrodialysis is the process by which ions are removed by charge from an aqueous stream and is well known to those skilled in the art of electrochemistry. In electrodialysis, the ionic charge of the impurity causes it to migrate toward either the cathode or the anode. The electrodes are usually isolated from the water stream by ion exchange membranes so that as the ionic impurity is drawn toward an electrode with an opposite charge, it passes through a membrane of a similar opposite charge and into a waste stream, thus leaving the product stream purified.

In filled-cell electrodialysis, particulate ion exchange resin is placed between the ion exchange membranes to facilitate the transport of the undesirable ions through the membranes and into the waste streams. This resin, however, becomes partially contaminated, or exhausted, by the impurities in the water. Some regeneration of resin will occur when the resin between the membranes is a mixture of cation and anion resin, but the regeneration is limited. Where the particulate resin bed is beads, water is split, and hydrogen ion and hydroxyl ion are formed in the presence of DC current where the cation beads touch the anion beads, where the cation beads touch the anion exchange membrane, and where the anion beads touch the cation exchange membrane. The hydrogen ion then partially regenerates the cation beads, and the hydroxyl ion partially regenerates the anion beads. However, the production of the regenerant ions, hydrogen ion and hydroxyl ion, is limited, because there are relatively few sites where the cation beads touch the anion beads or the beads touch oppositely charged membranes. These sites where the oppositely-charged beads and membranes mechanically touch are called bipolar junctions.

It is generally known, however, that weakly ionized species, such as carbon dioxide and silica, are not easily removed by electrodialysis, because their ionic charges are too weak at a neutral pH to cause them to migrate toward the electrode and into the waste stream. Therefore, water containing weakly ionized species cannot reach the ultimate purity of 18 megohm-cm resistivity, because these weakly ionized species remain in the product water.

In addition, it is sometimes necessary to adjust the pH of water. Usually, pH adjustment is achieved by adding acid to lower the pH or caustic to raise the pH. In high purity water applications, however, the acid or caustic adds impurities to the water, which must then be removed.

Although empty-cell and filled-cell electrodialysis processes are well known and commonly used in water purification, no prior art process has demonstrated the capability to regenerate ion exchange resins isolated from the electrodes in order to effectively remove high concentrations of weakly ionized species, such as carbon dioxide and silica, or readily adjust the pH of the product water.

SUMMARY OF THE INVENTION

In describing the present invention, specific terminology will be resorted to for the sake of clarity. However, the invention is not intended to be limited to the specific terms so selected, or to the specific embodiments disclosed. It is to be understood that each specific term includes all technical equivalents which operate in a similar manner to accomplish a similar purpose, and the specific embodiments are intended to illustrate, but not limit, the broad technical application and utility of the present invention.

The present invention relates to an electrolytic reactor and process for electrolytically purifying water and adjusting pH in water solutions or streams. The reactor comprises an anode, a cathode and an ion exchange material provided between the anode and cathode. In the preferred form, the ion exchange material is particulate and the particulate ion exchange material forms a closely packed bed between the electrodes. As used herein, the term "particulate ion exchange material" includes granules, beads or grains of ion exchange material.

The ion exchange material can be in contact with either the anode or the cathode, or both, or separated from both the anode and cathode by suitable ion exchange membranes. The ion exchange material functions as an immobile electrolyte having an infinite number of transfer sites. The ion exchange material and its transfer sites facilitate ionic mobility between the electrodes when using a dilute solution containing a reactive ionic species.

The ion exchange material is treated or modified so that the electrolytic reactor will have numerous "semiconductor junctions" incorporated into the ion exchange material. The semiconductor junctions are formed by permanently attaching an oppositely charged ionic species (counter ion) to the ion exchange material to occupy a percentage, preferably a minor percentage, of the exchange sites of the ion exchange material. Attachment of such a counter ion to an active site of the ion exchange material forms the semiconductor junction, which functions as an anode or a cathode, depending upon the ionic character of the counter ion, and acts as an electrocatalyst in the electrolytic reactions. The resulting modified ion exchange material is both ionically and electrically conductive.

While the ion exchange material of the electrolytic process and apparatus of the present invention is in many applications, a single species or monobed, such as all modified cation exchange resins or all modified anion exchange resins, it has been found that variation in the bed is possible in certain circumstances, and minor amounts of the opposite ion exchange material can be tolerated. In addition, while particulate ion exchange materials are the preferred physical form for the ion exchange material, other physical forms can be utilized. For example, ion exchange membranes and layered or lattice structured resin beds may have their ion exchange sites modified to form semiconductor junctions for use in the present invention.

Further, it has been found in accordance with the present invention that when a bed of modified ion exchange resin, whether a monobed of either cation exchange resin or anion exchange resin, or a mixed bed of both, is separated from both the anode and cathode, regenerant hydroxyl and regenerant hydrogen ions are formed at the semiconductor junctions. Typically, the resin bed is separated by ion exchange membranes. Ion exchange membranes suitable for isolating the electrodes from the modified ion exchange material are intended in their broadest context and include conventional ion selective membranes and diaphragms used in conventional electrodialysis, as well as all functional equivalents which segregate liquid and/or gas streams but allow selected ions to pass therethrough.

In accordance with this discovery, the ion exchange resins can be continuously regenerated electrically to displace the exchanged ions coming from a water stream being purified. Once these exchanged ions, or ionic impurities in the water, are displaced from the ion exchange resins, they leave the ion exchange chamber by conventional electrodialysis. The resulting purification of the water using the modified ion exchange materials in accordance with the present invention is much improved over conventional electrodialysis in that it has been found that weekly ionized species, such as carbon dioxide and silica, can be removed from the water stream to be purified. Further, it has been found, in accordance with the present invention, that the pH of the water can be adjusted, either up or down, in the water stream to be purified.

It is, therefore, an object of the present invention to provide an ion exchange material, modified to have semiconductor junction sites thereon, which can be employed in an electrolytic reactor to split water electrolytically and generate free radical hydroxyl, or free radical hydrogen, together with the respective regenerant hydrogen or regenerant hydroxyl ions in a suitable monobed, or both free radicals and regenerant ions in a suitable mixed bed.

A further object of the present invention is to utilize the modified ion exchange materials of the present invention in an electrolytic reactor for water purification or other treatment purposes, in which the semiconductor junction sites split water into regenerant hydrogen and/or hydroxyl ions which in turn electrolytically regenerate the resin material.

Another object of the present invention is to utilize the modified ion exchange material of the present invention in an electrolytic reactor to adjust the pH of the water stream.

These together with other objects and advantages which will become subsequently apparent reside in the details of the technology as more fully hereinafter described and claimed, reference being had to the accompanying drawings forming a part hereof, wherein like numerals refer to like parts throughout.

DETAILED DESCRIPTION OF THE INVENTION

Figure 1:
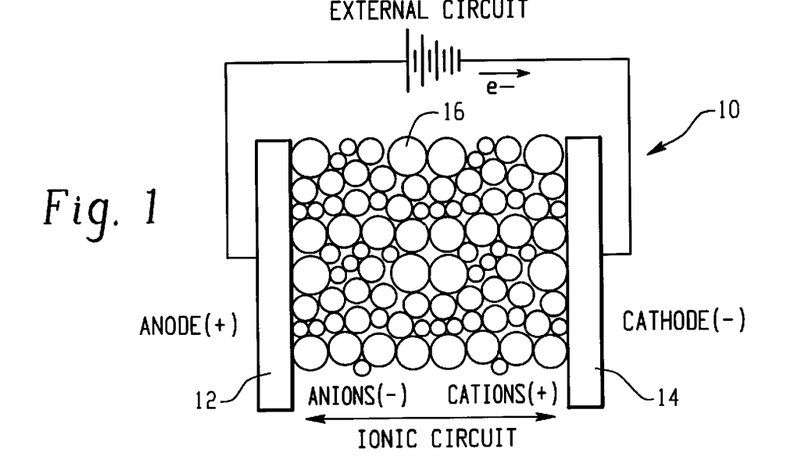
FIG. 1 shows a cross-sectional view of a basic packed bed electrolytic reactor with the ion exchange resin bed in contact with the electrodes in accordance with the present invention.

Referring now to FIG. 1, there is shown a cross-sectional view of a basic packed bed electrolytic reactor 10 of the present invention. The electrolytic reactor 10 includes an anode 12, a cathode 14 and a packed bed of particulate ion exchange material 16 located therebetween. The anode and cathode are connected to a source of direct current (DC) in a conventional manner. As shown, the anions move toward the anode and the cations move toward the cathode of the ionic circuit through the packed ion exchange material. Meanwhile, electrons travel the external circuit from the anode to the cathode in the conventional manner.

Figure 1A:
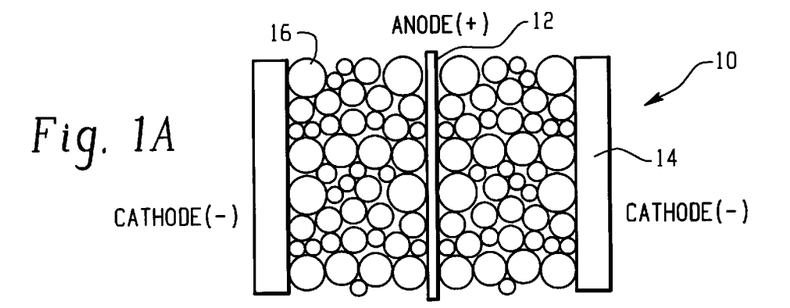
FIG. 1A shows a cross-sectional view of another basic packed bed electrolytic reactor with the ion exchange resin bed in contact with the electrodes in accordance with the present invention.
Figure 2:
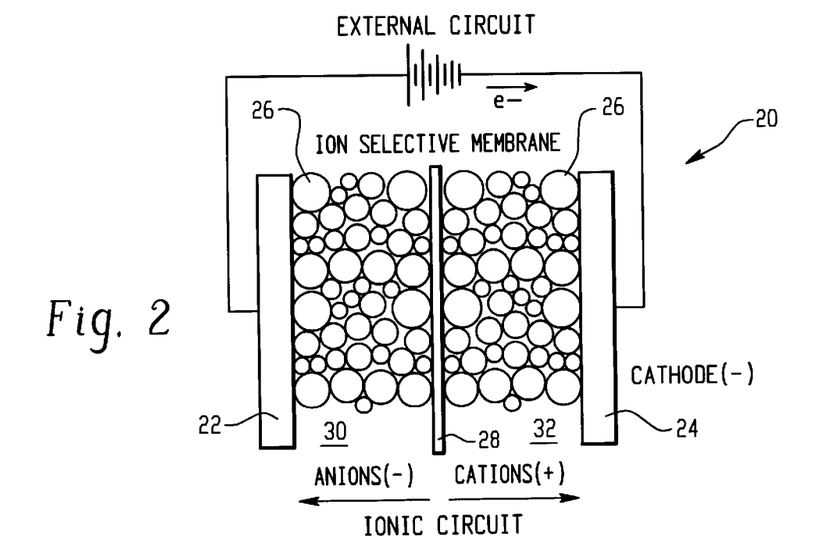
FIG. 2 shows a cross-sectional view of another embodiment of electrolytic reactor in accordance with the present invention.

In the embodiment shown in FIG. 1A where like numerals are used, the cathode 14 is in the form of a cylindrical tube, and the anode 12 extends substantially along the central axis of the cathode 14. The particulate ion exchange material 16 is packed into the annular space between the anode 12 and cathode 14. Another embodiment of a packed bed electrolytic reactor of this invention is shown in FIG. 2. In this embodiment, the electrolytic reactor 20 includes anode 22 and cathode 24 which may be in the shape of rods, plates or the like. The particulate ion exchange material 26 is divided into two chambers, anodic chamber 30 and cathodic chamber 32, separated by an ion exchange membrane 28.

Any arrangement in which a particulate ion exchange material is packed between the anode and cathode in an electrolytic reactor can be used in accordance with this invention. Other embodiments of the invention include, but are not limited to: separation of anolyte and catholyte compartments to control intermixing of gases and solutions; and provision of any number of packed bed chambers separated by ion exchange membranes placed between the anode and cathode to affect other oxidation, reduction, or displacement reactions.

Examples of ion exchange materials suitable for the present invention include: strong acid polystyrene divinylbenzene cross-linked cation exchangers; weak acid polystyrene divinylbenzene cross-linked cation exchange resins; iminodiacetic acid polystyrene divinylbenzene cross-linked chelating selective cation exchangers; strong base polystyrene divinylbenzene cross-linked Type I anion exchangers; weak base polystyrene divinylbenzene cross-linked anion exchangers; strong base/weak base polystyrene divinylbenzene cross-linked Type II anion exchangers; strong base/weak base acrylic anion exchangers; strong acid perfluoro sulfonated cation exchangers; strong base perfluoro aminated anion exchangers; naturally occurring anion exchangers such as certain clays; and naturally occurring cation exchangers such as manganese greensand. The foregoing identification of ion exchange materials is considered to be illustrative only of suitable types of ion exchange materials useful in the present invention, and is not intended to be limiting of the present invention. Furthermore, mixtures of anion and cation exchange particles or layers may also be used under certain circumstances in order to achieve a particular result.

Typical ion exchange resins which are commercially available and useful in the present invention are: IR 120 sold by Rohm and Haas Company, C 267 sold by Sybron Chemical Inc., and CG 68 sold by Resin Tech, Inc., typical of the synthetic strong acid cation exchange resins that have sulfonated exchange sites; IR 84 sold by Rohm and Haas, typical of synthetic weak acid exchange resins that have carboxylic acid sites; IRC 718 and C 467 sold by Rohm and Haas, typical of synthetic cation resins that are used for entrapping metal ions on a selective basis; manganese greensand, typical of naturally occurring cation exchangers; IRA 410 sold by Rohm and Haas, ASB 2 sold by Sybron Chemical, and SGG 2 sold by Resin Tech, typical of synthetic mixed base anion exchange resins that have quaternary ammonium groups as exchange sites; and IRA 94 sold by Rohm and Haas, typical of synthetic weak base exchange resins featuring tertiaryamine exchange sites.

The anode and the cathode may be made of any suitable material, based on the intended use of the electrolytic reactor. For example, the anode may be made of a conventional material, such as ruthenium and/or iridium on titanium metal or a titanium oxide ceramic, and the cathode may be stainless steel or steel. Suitable anode and cathode materials are known to those skilled in the art, and selection of a particular anode or cathode material is considered within the skill of those knowledgeable in this field.

In accordance with this invention, the bed of ion exchange material is specially treated or modified. Specifically, what has been discovered is that when an ionic site within an ion exchange bead, or other ion exchange material, is permanently exchanged with a counter ion that is not transferable, a semiconductor junction is formed which will split water molecules. Hence, when so treated, it was surprisingly found that these semiconductor junction sites act as extended anodic or cathodic sites at which oxidation or reduction regeneration can occur in the reactor, at locations spaced from the anode and cathode. In one embodiment, a portion of the total ion exchange sites converted to semiconductor junctions is between 1% and 95%. More preferably, the portion of the total ion exchange sites converted to semiconductor junctions is between 10% and 50%.

As used herein, the term "modified particulate ion exchange material" means particulate ion exchange materials, such as granules, beads, grains, and particles which have a portion of their ionic sites converted to semiconductor junctions as taught herein. The term "modified ion exchange material" has the same meaning as "modified particulate ion exchange material" except the ion exchange material is not necessarily particulate in nature, which means it is not necessarily in granules, beads, or grains. Such non-particulate ion exchange material may include, but is not limited to, ion exchange powder, membranes (as defined broadly hereinabove), and rods, as well as structures such as layered or lattice structures, formed therefrom. Such ion exchange materials are known to those skilled in the art and selection of a particular ion exchange material or structure is considered within the skill of those knowledgeable in this field.

The exchange of non-transferable ions can happen when selected slightly soluble multivalent ions are passed through an ion exchanger of the opposite charge displacing the soluble ions that are occupying those sites. They can be transferred or displaced only if they are reduced or oxidized to a more soluble species than the surrounding solution. For example, a cation exchange resin, such as IR 120 sold by Rohm and Haas, which has a very large number of immobile anionic sites, can have a multivalent ion such as $Fe^{+3}$ or $Pt^{+4}$ attached to a portion of the anionic sites. The multivalent ions are not transferable and, therefore, form a permanent semiconductor junction. The following is one example of such a semiconductor junction:

$$R\text{—}[SO_3]^{-4}Pt^{+4}$$

R is representative of the organic part of a cation exchange resin, and the sulfonate group represents the anionic sites thereof. Since the sulfonate group has a single negative charge, platinum in the +4 state ties up four $SO_3^-$ sites, and it becomes ionically bonded to the four sulfonate groups as a metal oxide. As so bonded, the $Pt^{+4}$ ion is not removable from those sites except by incineration.

It has been found that this cation $Pt^{+4}$ semiconductor junction acts similarly to bipolar ion exchange membranes where a cation selective membrane is bonded to an anion selective membrane in that the semiconductor junction can split the water molecules of the aqueous solution. However, the semiconductor junction does not form the hydroxyl ion ($OH^-$), as does the bipolar junction, but rather forms free radical hydroxyl ($OH°$) similar to an anode when in direct contact with an anode. Thus, each one of these semiconductor junctions acts as a mini anode to oxidize the available halide, sulfate or other anion in a solution in contact therewith. Meanwhile, the sites that are not bound up by the multivalent ion act as transfer sites for the mobile ions in the solution in the manner described in the previously identified Sampson patents. Further, since these $Pt^{+4}$ or cation semiconductor junctions are anodic, they carry a positive charge which attracts the anion to the site to be oxidized. The contrary happens on a anion resin that has a permanent anion attached, except that now the reaction is a reduction reaction. In this condition, the anion semiconductor junction can even reduce oxygen to water.

A cation exchanger that has counter ions permanently attached to its active ionic sites provides semiconductor junctions which are available for the production of free radical hydroxyl, thus making the solution an oxidizing solution. Similarly, an anion exchanger which has counter ions permanently attached to its active ionic sites now has semiconductor junctions for the production of free radical hydrogen, thus making the solution a reducing solution. In the example given above of $Pt^{+4}$ ionically bonded to sulfonate anionic sites, the semiconductor junction occurs within the metal sulfone group and can give rise to either water splitting or the generation of free radical hydroxyl and hydrogen ion. If the free radical does not locate a species to be oxidized, it decomposes back to hydroxyl ion, because it does not have an external circuit to contribute the electron to. The generation of this free radical hydroxyl and its decomposition is extremely rapid and is believed to have a half life of less than 1/10,000 of a second.

As such, these semiconductor junctions serve as additional sites for the production of free radical hydroxyl or free radical hydrogen, in addition to the anode and cathode themselves. These junctions significantly increase the number of sites at which the electrolytic reactions take place. At the same time, these junctions attract the species to be oxidized or reduced because they are oppositely charged. Thus, the semiconductor junctions not only increase the sites for producing the free radicals, but also act to decrease the time it takes for the species to reach a reaction site.

Another aspect of the water splitting reaction at the semiconductor junctions is that it forms the hydrogen ion ($H^+$) and the hydroxyl ion ($OH^-$) if there is nothing to be oxidized or capable of being oxidized at the junction. The hydrogen ion is in excess to the equilibria and has the ability to ionically displace mobile cations that are located on the transfer sites unoccupied by the semiconductor junctions. As the water splitting reactions proceed, more and more mobile cations are displaced, and a majority of the transfer sites are converted to the hydrogen form. The opposite reaction takes place on the anion resin in that the semiconductor junctions are of a reducing nature, and the excess hydroxyl ions are capable of displacing mobile anions that are located on the adjacent transfer sites. The result of the displacement reactions is the "regenerating" of the ion exchange material by internally generated chemical. The reactions from the splitting of water are as follows:

Anodic Reactions $$2H_2O - 4e^- \leftrightarrows O_2 + 4H^+$$

Cathodic Reactions $$2H_2O + 2e^- \leftrightarrows H_2 + 2OH^-$$

Hence, the ion exchange materials could be placed between electrodes or ion selective membranes in a direct current field and regenerate those materials in place by internally generated hydrogen and hydroxyl ions. These materials can be arranged in a mixture of cation and anion exchange materials or in discrete layers of cation material and anion material. The arrangement of such materials is analogous to mixed bed ion exchange systems and separate bed ion exchange systems.

If the ion exchange material is separated from the electrodes by ion exchange membranes or ion selective membranes, the semiconductor junctions act as bipolar junctions. Preferably, the ion exchange or selective membrane is chosen for separation of each electrode to have a charge which is the same as the adjacent electrode. Thus, the cathode preferably is separated from the ion exchange material by a cation exchange membrane and, conversely, the anode preferably is separated from the ion exchange material by an anion exchange membrane.

When the ion exchange material is separated from the electrodes, no free radical is formed because there is no contact between the ion exchange material and the electrodes. No oxidation or reduction can occur because there is no external electrical circuit to transfer electrons to the semiconductor junctions on the ion exchange material. However, water is split or dissociated at the junctions, and hydrogen ion and hydroxyl ion are formed. The hydrogen ion can then be used to regenerate a cation exchange material present and the hydroxyl ion can be used to regenerate an anion exchange material present.

It is sometimes desirable to mix or intersperse an additive into the modified resin material within the bed. Such additives may include, but are not limited to, unmodified ion exchange materials or electrically conductive materials. These additives may be used to suppress byproduct formation, increase ionic mobility, or reduce electrical resistance within the packed bed. Such practices are well known to those skilled in the art of electrochemistry.

It has also been found that pH can be controlled by varying the number of semiconductor junctions loaded on the ion exchange material and the amperage applied to that same ion exchange material. An unpacked reactor has no effect on pH, because it contains no ion exchange material and, therefore, cannot utilize the excess hydrogen ion and excess hydroxyl ion generated at the semiconductor junctions. In other words, an unpacked reactor has no effect on pH versus current as equivalent amounts of hydroxyl and hydrogen ions are made. This phenomena is directly analogous to the aforementioned displacement/regeneration reactions. In contrast, according to the present invention, if the ion exchanger is heavily loaded with metal ions and many semiconductor junctions are formed, the number of transfer sites will be limited both for displacement and transfer of ions to be oxidized. This will result in a solution with a lower pH and higher redox potential. The ratio of transfer sites to semiconductor junctions can be optimized and used to control the solution to be produced.

It has further been found that adjustment of the pH of an aqueous solution to be demineralized can significantly enhance the purification of the water in circumstances where the water contains normally weak contaminating ions which can be converted to an ionic state by pH adjustment: to thus facilitate removal of such contaminating ions. For example, aqueous solutions to be deionized often contain silicic acid, or $SiO_2^{-2}$ ions, which is normally weakly acidic, that typically fouls the purifying ion exchange resins and passes through the deionization process. By adjusting the pH of the contaminated aqueous solution in accordance with the present invention to make the aqueous solution more alkaline, the normally weak silicic acid is converted to its ionic state, silicate ion and thereby can be readily removed.

DESCRIPTION OF SPECIFIC EMBODIMENTS AND EXAMPLES

The Packed Bed Electrolytic Reactors

One example of a packed bed electrolytic reactor having the configuration shown in FIGS. 1A and 3 was constructed as follows.

Anode 12 was centered inside a tubular cathode 14 to permit liquid flow from bottom to top in the annular space defined between the anode and the cathode. The anode 12 was a titanium dimensionally stable anode coated with iridium oxide comprising two pieces, each of which was 12 inches long×0.5 inches wide, the structure being an expanded metal mesh with center conducting wire 13 in between. The surface area of the anode was approximately 22.5 $in^2$ (145 $cm^2$). The cathode 14 was a tubular 316 stainless steel pipe with plastic end caps 34 and 36. The cathode had a 1 inch inner diameter and was 12 inches long. The surface area of the cathode was 37.7 $in^2$ (243.2 $cm^2$).

Particulate ion exchange resin was poured into the annular space between the anode and the cathode along with water to completely fill the void space so that the packed particulate ion exchange material contacted itself as well as the anode and cathode. Porous polypropylene plugs 38 and 40 were provided at the top and bottom of the cathode to retain the packed particulate ion exchange material within the annular space between the cathode and anode. Appropriate fittings 42 and 44 are drilled and tapped into the caps 34 and 36 to allow for extension and centering of the electrode wire 13, and inlet and outlet fittings 46 and 48 are provided to allow for fluid ingress and egress.

Figure 3:
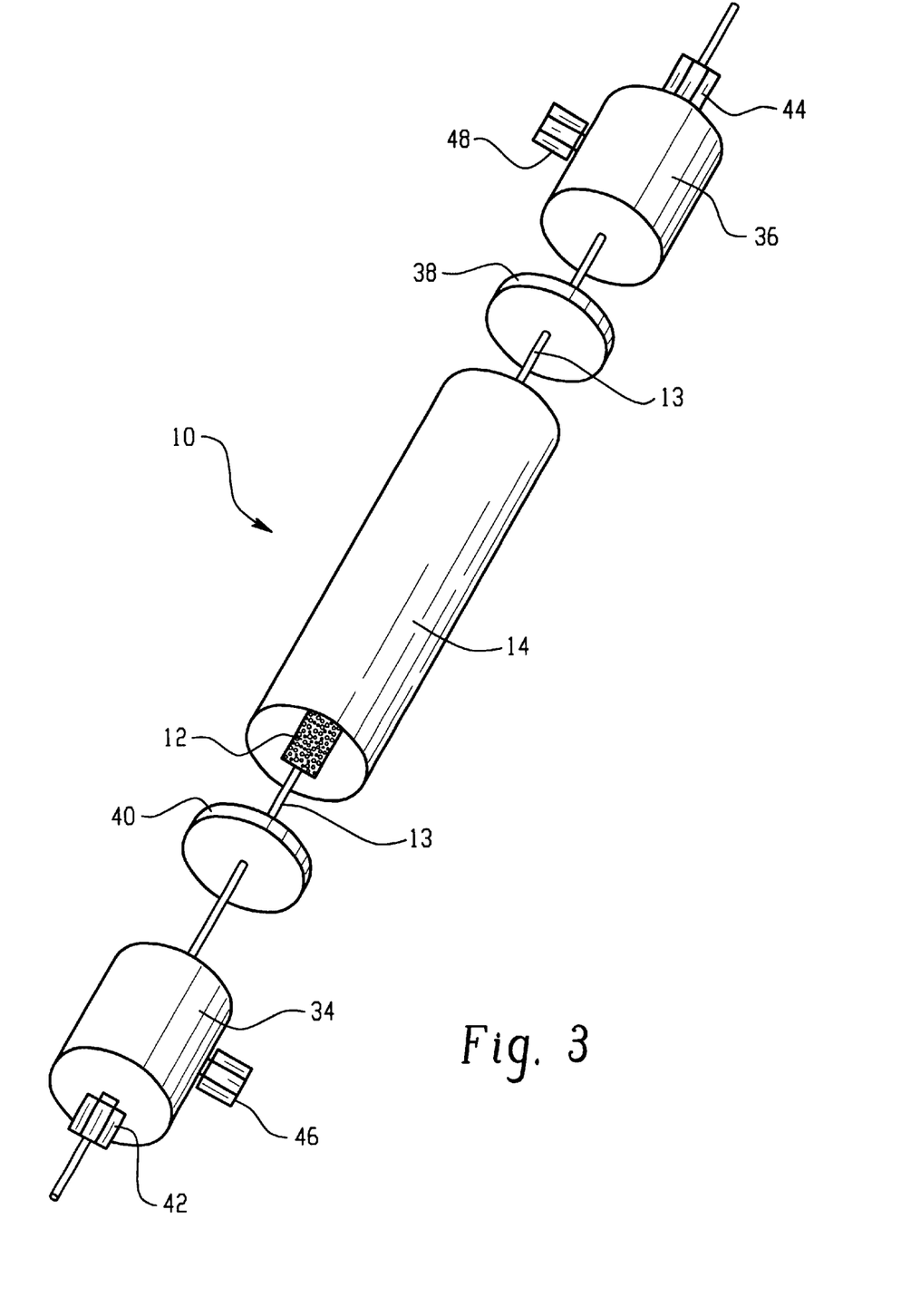
FIG. 3 shows an exploded perspective view of an electrolytic reactor constructed in accordance with FIG. 1A.

When a direct current is applied to the reactor as described in FIGS. 1 and 3 either in a monopolar fashion, or a bipolar fashion such as described in the previously identified Sampson U.S. Pat. No. 5,705,050, both free radicals and regenerant ions are formed. If the annular space is filled with modified cation resin, free radical hydroxyl and regenerant hydrogen ion are formed. If there is nothing to be oxidized, the free radical hydroxyl decomposes to hydroxyl ion. If the annular space is filled with modified anion resin, free radical hydrogen and regenerant hydroxyl ion are formed. If there is nothing to be reduced, the free radical hydrogen decomposes to hydrogen ion.

Figure 4:
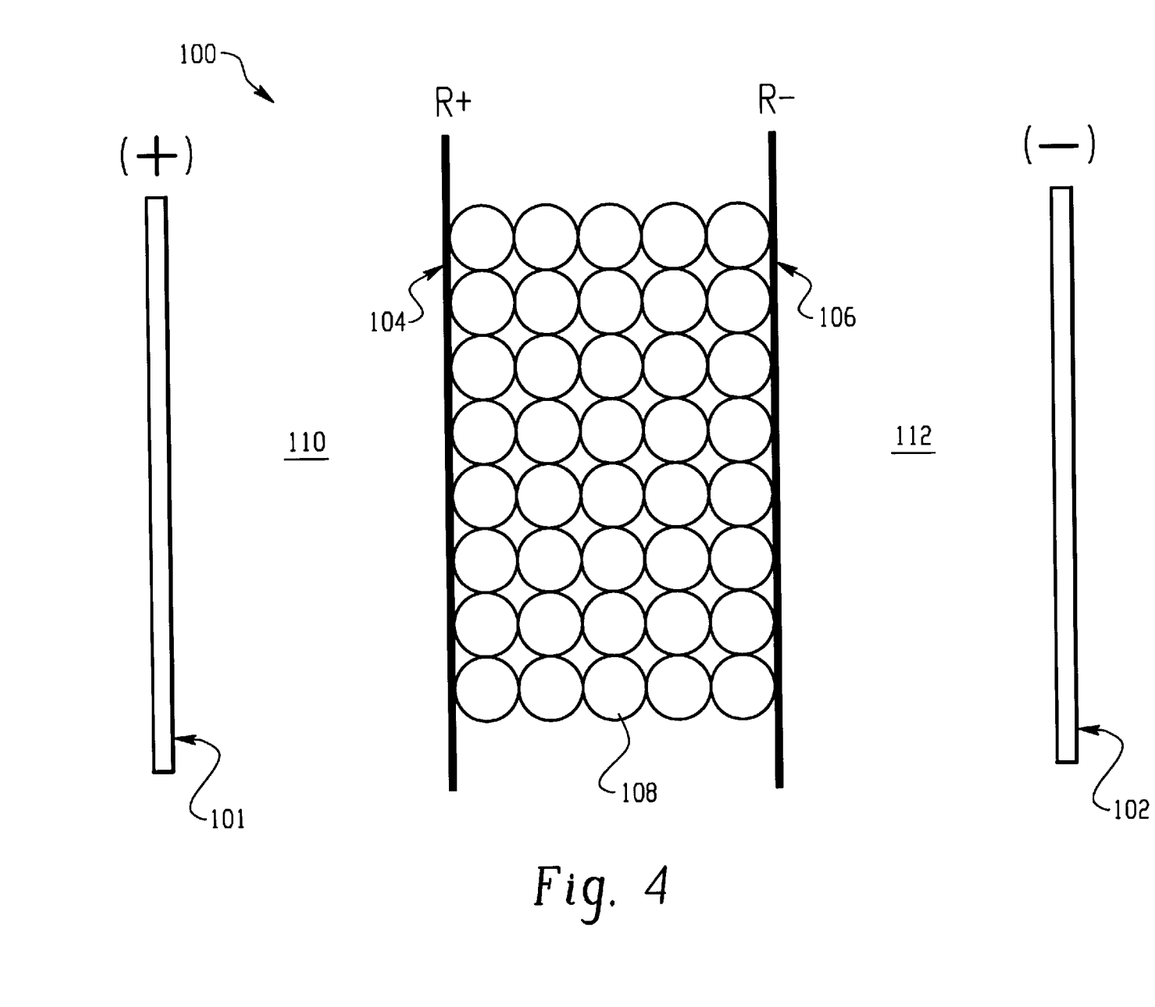
FIG. 4 shows a schematic cross-sectional view of another packed bed electrolytic reactor, in accordance with the present invention, with a modified resin bed separated from the electrodes, and used in connection with the tests producing the results illustrated in FIGS. 6, 7 and 8.
Figure 5:
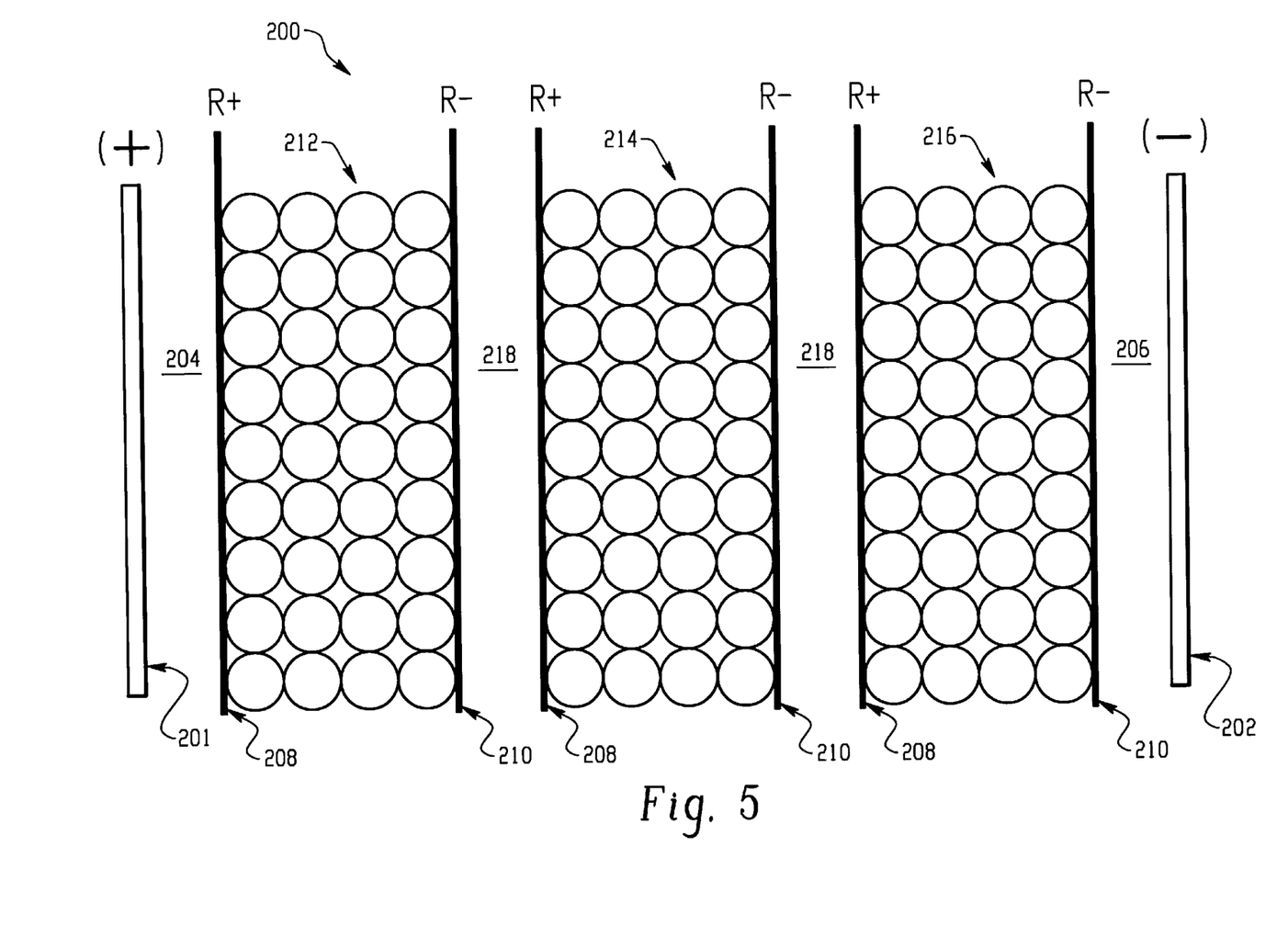
FIG. 5 shows a schematic cross-sectional view of still another embodiment of an electrolytic reactor, in accordance with the present invention, with a modified resin bed separated from the electrodes, and used in connection with the tests producing the results illustrated in FIG. 9.

Other examples of packed bed electrolytic reactors in accordance with the present invention are illustrated in FIGS. 4 and 5 which reactors are especially suitable for water purification. Referring specifically to FIG. 4, there is shown a schematic cross-sectional view of an electrolytic reactor generally designated by the numeral 100. The reactor 100 includes an anode 101, a cathode 102, an anion exchange membrane 104, a cation exchange membrane 106, and a bed of ion exchange material 108, modified in accordance with the present invention to include semiconductor junctions, and packed between the anion exchange membrane 104 and cation exchange membrane 106. An anode chamber 110 is formed between anion exchange membrane 104 and anode 101, and a cathode chamber 112 is formed between cation exchange membrane 106 and cathode 102. The anode 101 and cathode 102 may be in the shape of rods, plates, or the like. The anode and cathode are connected to a source of direct current (DC) in a conventional manner. In accordance with the present invention, the modified ion exchange material 108 can be a monobed of modified cation exchange material or modified anion exchange material, or any suitable mixed bed containing the modified cation and anion exchange resins.

When the reactor is filled with water or other dilute aqueous solutions and a direct current is applied, the semiconductor junctions on the ion exchange material 108 produce regenerant hydrogen ions and/or regenerant hydroxyl ions. These regenerant ions exchange onto the transfer sites of the ion exchange material. The regenerant hydroxyl ions exchange onto the anionic transfer sites forcing the undesirable anions through the anion exchange membrane 104 and into the anode chamber 110 by electrodialysis. The regenerant hydrogen ions exchange onto the cationic transfer sites forcing the undesirable cations through the cation exchange membrane 106 and into the cathode chamber 112 by electrodialysis. The phenomenon of electrodialysis is well known to those schooled in the art of electrochemistry.

Referring now to FIG. 5, there is shown a schematic cross-sectional view of another embodiment of a packed bed electrolytic reactor especially suitable for water purification in accordance with the present invention. The electrolytic reactor generally designated by the numeral 200 includes an anode 201, a cathode 202, an anode chamber 204, a cathode chamber 206, anion exchange membranes 208, cation exchange membranes 210, packed bed modified ion exchange materials 212, 214, and 216, and ion removal chambers 218. The anode 201 and cathode 202 may be in the shape of rods, plates, or the like. The anode 201 and cathode 202 are connected to a source of direct current (DC) in a conventional manner. By way of example only, ion exchange material 212 can be anion exchange resin modified to include semiconductor junctions in accordance with the present invention, ion exchange material 214 can be cation exchange resin modified to include semiconductor junctions in accordance with the present invention, and ion exchange material 216 can be a mixed bed of the modified anion and cation exchange resins. However, any suitable arrangement and combination of the monobed and mixed bed modified resins is contemplated in accordance with the present invention.

When a direct current is applied, the semiconductor junctions on the ion exchange materials produce regenerant ions. These regenerant ions exchange onto the transfer sites of the ion exchange materials. The regenerant hydroxyl ions exchange onto the anionic transfer sites forcing the undesirable anions through the anion exchange membranes 208 and into the anode chamber 204 and the ion removal chambers 218 by electrodialysis. At the same time, the regenerant hydrogen ions exchange onto the cationic transfer sites forcing the undesirable cations through the cation exchange membranes 210 and into the cathode chamber 206 and the ion removal chambers 218 by electrodialysis. The phenomenon of electrodialysis is well known to those schooled in the art of electrochemistry.

Formation of Free Radical and Regenerant Ions

For Examples 1, 4 and 5, a Thornton 200CR Conductivity/Resistivity Meter was used to measure the conductivity or resistivity of the methanol solution and the sodium bicarbonate solution. An in-line probe was placed in the exit stream of the reactor in each example to measure the conductivity or resistivity of each solution. For Examples 2 and 3, a Hach 43800-00 pH meter was used to test the pH of the sodium chloride solutions before and after each reactor.

EXAMPLE 1
Free Radical Hydroxyl Formation to Oxidize Methanol

A methanol feed solution was prepared by adding methanol to deionized water such that the final concentration of methanol approximated 100 mg/l methanol. The final resistivity of the solution was tested to be 10 megohm-cm (0.10 microsiemen/cm conductivity).

(A) A continuous stream of the methanol feed solution was passed through the packed bed electrolytic reactor, having the structure illustrated in FIGS. 1A and 3 and described above in connection therewith, by passing the methanol solution through the reactor from the bottom to top such that the methanol solution had a flow rate of about 100 ml/min through the electrolytic reactor. The space around the anode in this example was packed with strong acid perfluoro sulfonated cation exchange material having about 15% of its transfer sites converted to semiconductor junctions with manganese in accordance with the teaching of the aforesaid Sampson patents. No current was applied to the anode and cathode.

(B) The procedure (A) above was repeated, with the exception that a controlled current of 2.0 Amps was continuously applied to the anode and cathode.

Figure 6:
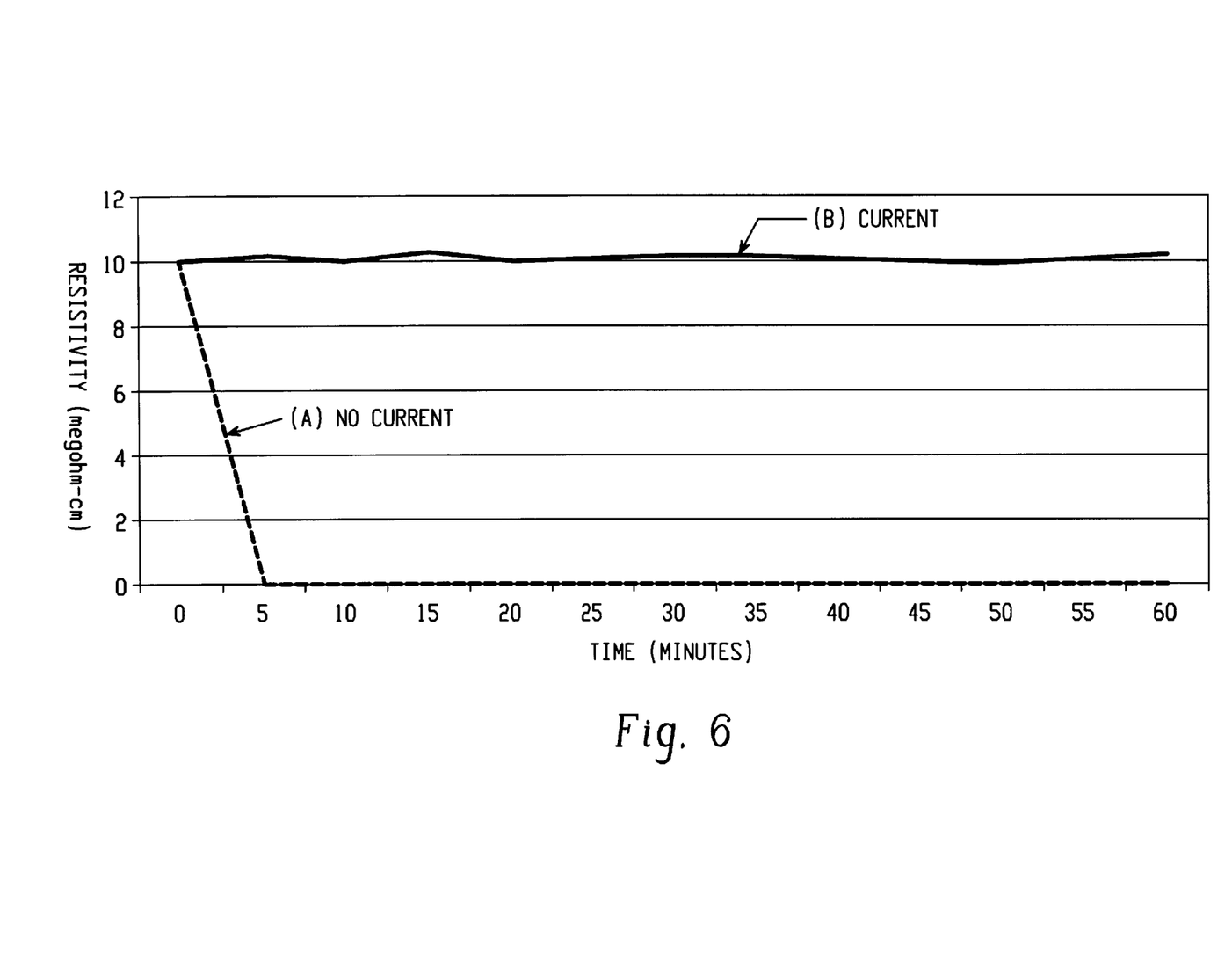
FIG. 6 is a graph showing the resistivity of an existing methanol solution over time produced by the oxidation of the methanol in accordance with the present invention, with a direct current applied verus when a direct current is not applied.

The results of the processes in procedures (A) and (B) are shown in FIG. 6. FIG. 6 shows the conductivity change of the exiting methanol solution over time. As shown therein, a conductivity change of the solution occurs only when a current is applied to the reactor. Since methanol is not conductive except in its oxidized form, the decrease in resistivity to near zero indicates the oxidation of the methanol. Further, since oxidation of methanol cannot occur without the presence of free radical hydroxyl, the methanol oxidation demonstrates the production of free radical hydroxyl in accordance with the present invention.

EXAMPLE 2
Hydrogen Ion Formation to Regenerate Cation Exchange Material and Lower pH A sodium chloride feed solution was prepared by adding sodium chloride to reverse osmosis water such that the final concentration of chloride approximated 100 mg/l as chloride. The pH of the solution was tested to be 7.04.

(A) A continuous stream of the chloride feed solution was passed through a packed bed electrolytic reactor, having the structure illustrated in FIG. 4 and described above in connection therewith, by passing the chloride solution through the modified ion exchange resin 108 from the bottom to top such that the chloride solution had a flow rate of about 500 ml/min through the electrolytic reactor bed. The space between the membranes in this example was packed with strong acid polystyrene divinylbenzene cross-linked cation exchange material having about 15% of its transfer sites converted to semiconductor junctions with manganese in accordance with the teaching of the aforesaid Sampson patents. The membranes 104 and 106 were, respectively, conventional anion and cation exchange membranes. No current was applied to the anode and cathode.

(B) The procedure (A) above was repeated, with the exception that a controlled current of 2.0 Amps was continuously applied to the anode and cathode.

Figure 7:
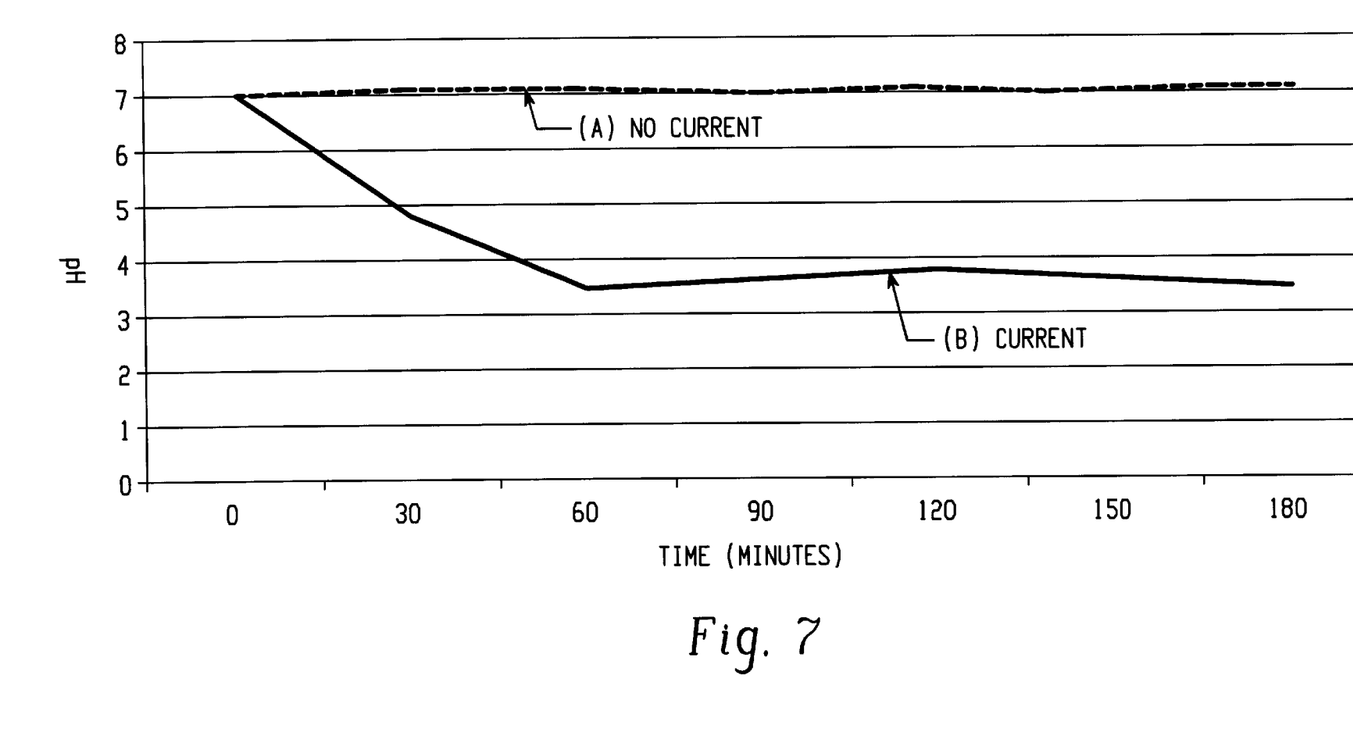
FIG. 7 is a graph showing the pH of an exiting sodium chloride solution over time produced by regenerant hydrogen ion, in accordance with the present invention, with a direct current applied versus when a direct current is not applied.

The results of the processes in procedures (A) and (B) are shown in FIG. 7. FIG. 7 shows the pH change of the exiting sodium chloride solution over time. As shown therein, a lower pH of the exiting solution occurs only when a current is applied to the reactor. Since the lower pH over time indicates a higher concentration of hydrogen ion, these results show the formation of the regenerant hydrogen ion and the ability to electrolytically lower pH in accordance with the present invention.

EXAMPLE 3
Hydroxyl Ion Formation to Regenerate Anion Exchange Material and Increase pH A sodium chloride feed solution was prepared by adding sodium chloride to reverse osmosis water such that the final concentration of chloride approximated 100 mg/l as chloride. The final pH of the solution was tested to be 7.04.

(A) A continuous stream of the chloride feed solution was passed through the packed bed electrolytic reactor, having the structure illustrated in FIG. 4 and described above in connection therewith, by passing the chloride solution upwardly through the modified exchange material 108 from the bottom to top such that the chloride solution had a flow rate of about 500 ml/min through the electrolytic reactor. The space between the membranes in this example was packed with strong base polystyrene divinylbenzene cross-linked Type I anion exchange material having about 15% of its transfer sites converted to semiconductor junctions with SPS 70 in accordance with the teaching of the aforesaid Sampson patents. The membranes 104 and 106 were, respectively, conventional anion and cation exchange membranes. No current was applied to the anode and cathode.

(B) The procedure (A) above was repeated, with the exception that a controlled current of 2.0 Amps was applied to the anode and cathode.

Figure 8:
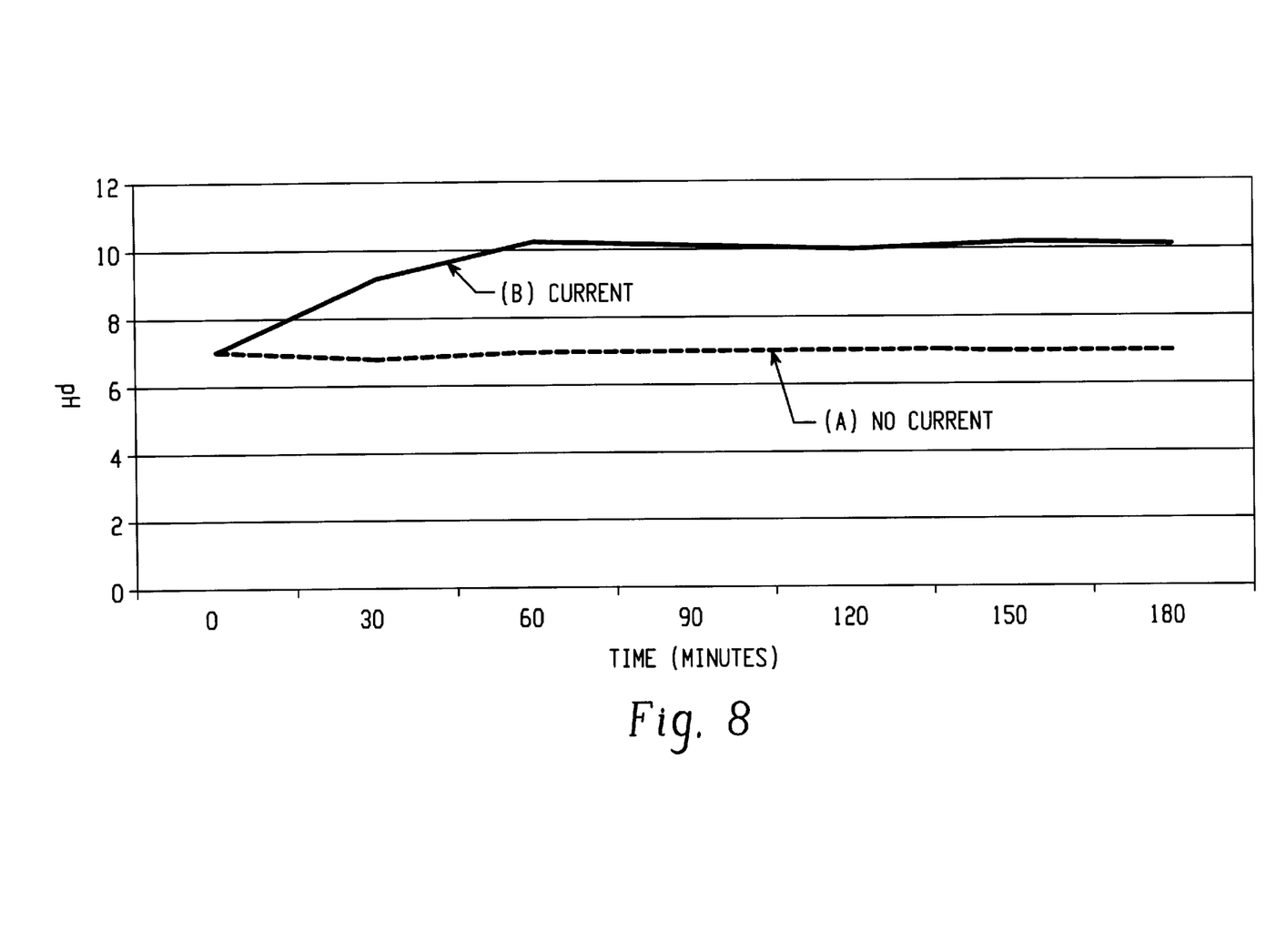
FIG. 8 is a graph showing the pH of an exiting sodium chloride solution over time produced by regenerant hydroxyl ion, in accordance with the present invention, with a direct current applied versus when a direct current is not applied.

The results of the processes in procedures (A) and (B) are shown in FIG. 8. FIG. 8 shows the pH change of the exiting sodium chloride solution over time. As shown therein, a higher pH of the exiting solution occurs only when a current is applied to the reactor. Since the higher pH over time indicates a reduction in the concentration of hydrogen ion, or an increase in the concentration of the hydroxyl ion, these results show the formation of the regenerant hydroxyl ion and the ability to electrolytically increase pH in accordance with the present invention.

EXAMPLE 4
Hydroxyl Ion and Hydrogen Ion Formation to Regenerate a Mixed Bed of Ion Exchange Material An electrolytic reactor, having the structure illustrated in FIG. 4 and described above in connection therewith, was assembled such that the space between the membranes was filled with a mixture of strong acid polystyrene divinylbenzene cross-linked cation exchange material having about 15% of its transfer sites converted to semiconductor junctions with manganese and strong base polystyrene divinylbenzene cross-linked Type I anion exchange material having about 15% of its transfer sites converted to semiconductor junctions with SPS 70, each converted in accordance with the teaching of the aforesaid Sampson patents. The mixture was made in the ratio of 40% cation exchange material and 60% anion exchange material, and all of the ion exchange material was in its fully regenerated form. Fifty liters of a 1000 mg/l sodium chloride solution was passed through the packed bed electrolytic reactor at which time sodium chloride was detected in the exit water stream. This indicated that the cation exchange material was in the sodium form, and the anion exchange material was in the chloride form. No current was applied to the anode and cathode.

(A) A continuous stream of deionized water was then passed through the packed bed electrolytic reactor, as described, by passing the deionized water upwardly through the mixed bed from the bottom to top such that the deionized water had a flow rate of about 500 ml/min through the reactor. No current was applied to the anode and cathode.

(B) The procedure (A) above was repeated, with the exception that a controlled current of 2.8 Amps was applied to the anode and cathode for one hour.

Figure 9:
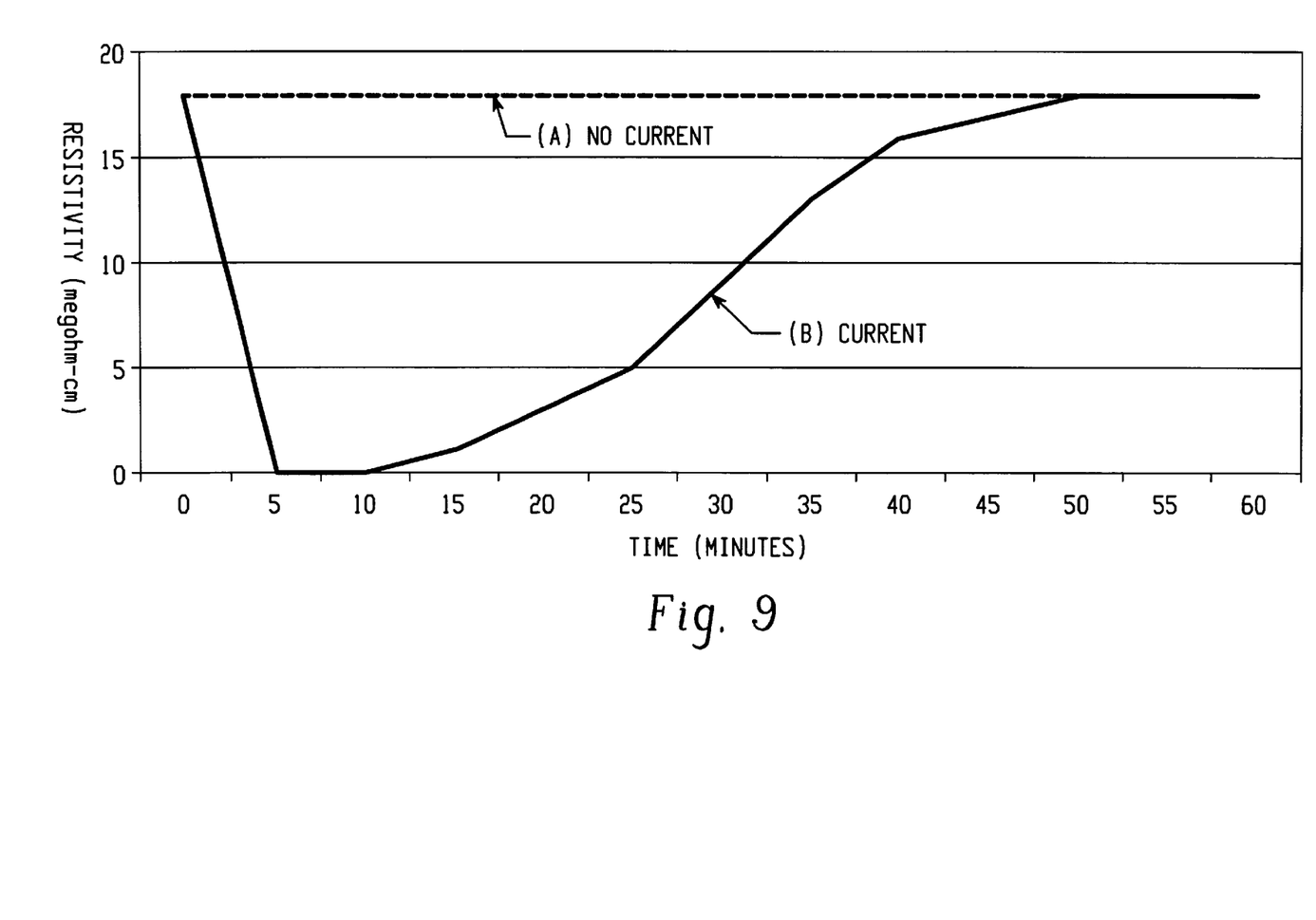
FIG. 9 is a graph showing the resistivity of an exiting deionized water solution over time produced by regenerant hydrogen ions and regenerant hydroxyl ions regenerating the packed bed, in accordance with the present invention, with a direct current applied versus when a direct current is not applied.

The results of the processes in procedures (A) and (B) are shown in FIG. 9. FIG. 9 shows the resistivity change of the exiting water solution over time. As shown therein, a drastic reduction in the resistivity of the exiting water solution, indicating the regeneration of the ion exchange material, occurs only when a current is applied to the reactor.

(C) After the completion of (B), the current was turned off, and the flow of aqueous solution was halted. A 1000 mg/l sodium chloride solution was passed through the packed bed electrolytic reactor until sodium chloride was detected in the exit water stream. This occurred at 31 liters indicating that the ion exchange material had been partially regenerated during (B).

Purification of Aqueous Solutions

Figure 10:
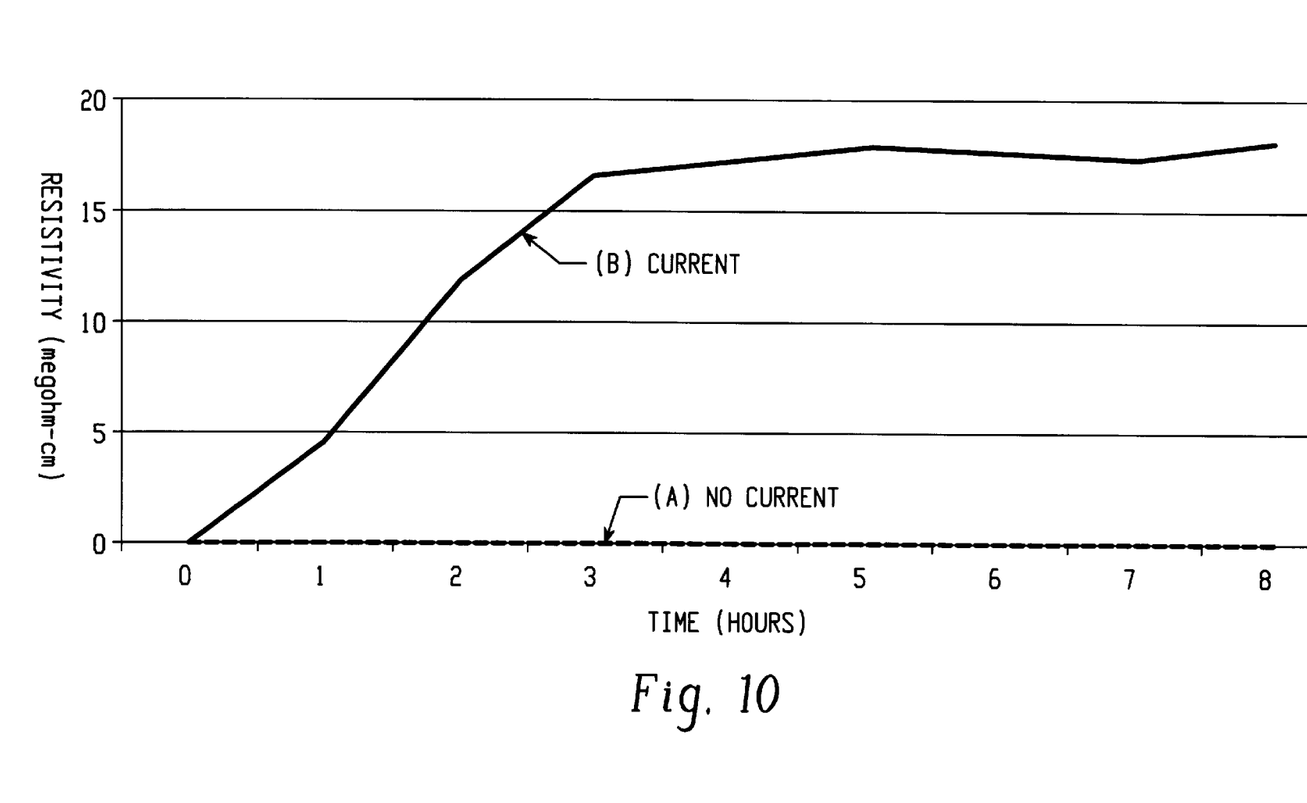
FIG. 10 is a graph showing the resistivity of an exiting water solution containing sodium bicarbonate and carbon dioxide over time produced by regenerant hydrogen ions and regenerant hydroxyl ions regenerating the packed bed and purifying the aqueous solution, in accordance with the present invention, with a direct current applied versus when a direct current is not applied.

The following example demonstrates the electrolytic process of the present invention for the controlled purification of aqueous solutions. In the example, the tests were done with an electrolytic reactor having the structure as illustrated in FIG. 5 and described above. All water was tempered to 77° F. and all solutions flowed upwardly through the ion exchange materials. The graph shown in FIG. 10 illustrates the results in resistivity of the exiting solution with and without application of electric current to the reactor.

EXAMPLE 5

Purification of an Aqueous Solution

A solution of reverse osmosis water containing sodium bicarbonate and carbon dioxide was prepared. The final resistivity was tested to be 0.05 megohm-cm.

(A) A continuous stream of the reverse osmosis water was passed through the packed bed electrolytic reactor by passing the reverse osmosis water upwardly through each ion exchange material 212, 214 and 216 in sequence from the bottom to top. The reverse osmosis water had a flow rate of about 500 ml/min through the electrolytic reactor. The reverse osmosis water was thus passed in series through each of the three chambers containing the ion exchange materials. The resin 212 in the first chamber in this example was strong base polystyrene divinylbenzene cross-linked Type I anion exchange material in the chloride form having about 15% of its transfer sites converted to semiconductor junctions with SPS 70. The resin 214 in the second chamber was strong acid polystyrene divinylbenzene cross-linked cation exchange material in the sodium form having about 15% of its transfer sites converted to semiconductor junctions with manganese. The resin 216 in the third chamber was a mixture of 40% strong acid polystyrene divinylbenzene cross-linked cation exchange material in the sodium form having about 15% of its transfer sites converted to semiconductor junctions with manganese and 60% strong base polystyrene divinylbenzene cross-linked Type I anion exchange material in the chloride form having about 15% of its transfer sites converted to semiconductor junctions with SPS 70. Each modified resin was converted in accordance with the teaching of the aforesaid Sampson patents. The ion exchange membranes 208 and 210 were, respectively, conventional anion and cation exchange membranes. No current was applied to the anode and cathode.

(B) The procedure (A) above was repeated, with the exception that a controlled current of 2.0 Amps was applied to the anode and cathode.

The results of the processes in procedures (A) and (B) are shown in FIG. 10. FIG. 10 shows the resistivity change of the exiting water solution over time. As shown therein, an increased resistivity of the exiting solution, indicating the purification of the reverse osmosis water, occurs only when a current is applied to the reactor.

It is preferred that the ion exchange material be packed tightly in the electrolytic reactor so as to ensure intimate contact between the ion exchange material particles themselves, the ion exchange membranes, and the electrodes, if in contact with one or both electrodes. This intimate contact ensures the highest efficiency of the purification or the conversion, if oxidation or reduction. However, it is contemplated as part of this invention that loose packing of the ion exchange material can be employed in appropriate circumstances. Although not necessarily achieving the highest overall efficiency for the system, there may be circumstances in which loose packing can be employed, since the benefits obtained by the present invention can still be achieved.

Water purification and pH adjustment using an electrolytic reactor containing modified ion exchange resin in accordance with the present invention can be achieved with the ion exchange material in contact with one electrode or both as the case may be. However, it is preferred to separate the ion exchange material from the electrodes and, when using the preferred particulate modified ion exchange material, it is preferred to separate the bed from the electrodes with ion exchange membranes such as in a reactor having the schematic arrangement of either FIG. 4 or FIG. 5.

Further, as described hereinbefore, the modified ion exchange material of the present invention need not be particulate, such as granules, beads or grains. Non-particulate ion exchange materials, such as powder, membranes and structures formed from powder, particulate or membranes, can likewise be modified in accordance with the present invention by forming semiconductor junctions on a portion of the ionic sites of the ion exchange material. Also, as stated, minor amounts of the opposite ion exchange material can be tolerated in a monobed ion exchange reactor and, in appropriate circumstances, such as described above, a mixed bed having both modified anion exchange resin and modified cation exchange resin can be utilized in the reactor within the scope of the present invention. In a mixed bed, the modified anion exchange resin and modified cation exchange resin can be appropriately layered as known in the art.

The foregoing descriptions and drawings should be considered as illustrative only of the principles of the invention. Since numerous applications of the present invention will readily occur to those skilled in the art, it is not desired to limit the invention to the specific examples disclosed or the exact construction and operation shown and described. Rather, all suitable modifications and equivalents may be resorted to, falling within the scope of the invention.

What is claimed is:

1. An electrolytic reactor which comprises an anode and an anion exchange membrane adjacent said anode to define an anode chamber, a cathode and a cation exchange membrane adjacent said cathode to define a cathode chamber and an ion exchange material between said anode and said cathode chambers, said ion exchange material modified by having a portion of the total ion exchange sites converted to semiconductor junctions.

2. An electrolytic reactor as defined in claim 1, wherein said modified ion exchange material is a modified cation exchange material or a modified anion exchange material.

3. An electrolytic reactor as defined in claim 1, wherein said modified ion exchange material is a mixture of modified anion and cation exchange materials.

4. An electrolytic reactor as defined in claim 3, wherein said semiconductor junctions are formed by polyvalent metal cations permanently bonded to said cation exchange material and by polyvalent anions permanently bonded to said anion exchange material.

5. An electrolytic reactor as defined in claim 1, wherein said ion exchange material is particulate and forms a bed between said anode and cathode chambers.

6. An electrolytic reactor as defined in claim 5, wherein said particulate modified ion exchange material is in physical contact with said ion exchange membranes spaced from said anode and said cathode.

7. An electrolytic reactor as defined in claim 1, wherein said ion exchange material forms at least two chambers, and said chambers are separated by at least one ion exchange membrane.

8. An electrolytic reactor as defined in claim 1, wherein said ion exchange material is a cation exchange material which forms hydrogen ion under the influence of a controlled current continuously applied to said anode and cathode and reduces the pH of an aqueous solution in contact with said ion exchange material.

9. An electrolytic reactor as defined in claim 1, wherein said ion exchange material is an anion exchange material which forms hydroxyl ion under the influence of a controlled current continuously applied to said anode and cathode and increases the pH of an aqueous solution in contact with said ion exchange material.

10. An electrolytic reactor as defined in claim 1 wherein said semiconductor junctions are formed by permanently bonding counter ions to a portion of said ion exchange material.

11. An electrolytic reactor as defined in claim 1, wherein said semiconductor junctions are sufficient to cause formation of regenerant ions under influence of direct electric potential.

12. An electrolytic reactor as defined in claim 1, wherein said portion of the total ion exchange sites converted to semiconductor junctions is between 1% and 95%.

13. An electrolytic reactor as defined in claim 12, wherein said portion is between 10% and 50%.

14. An electrolytic reactor as defined in claim 1, wherein said ion exchange material includes an additive in addition to said modified ion exchange material.

15. An electrolytic process for regenerating ion exchangers and purifying aqueous solutions comprising:

passing an aqueous solution containing undesirable ions through an ion exchange material having a portion of its total ion exchange sites converted to semiconductor junctions;

applying an electrical potential between at least two electrodes causing regenerant ions to be formed at the semiconductor junctions;

contacting said aqueous solution with said ion exchange material for a time sufficient to exchange said undesirable ions in said aqueous solution onto said ion exchange material;

contacting aid regenerant ions with said ion exchange material for a time sufficient to cause the exchange of said regenerant ions with said undesirable ions on said material; and contacting said aqueous solution with said ion exchange material for a time sufficient to remove said undesirable ions by electrodialysis and purify said aqueous solution.

16. A process as defined in claim 15, wherein said ion exchange material is separated from said electrodes.

17. A process as defined in claim 15, wherein the ion exchange material is a cation exchange material and the regenerant ion is hydrogen ion.

18. A process as defined in claim 15, wherein the ion exchange material is an anion exchange material and the regenerant ion is hydroxyl ion.

19. A process as defined in claim 15, wherein the ion exchange material is a mixture of cation exchange material and anion exchange material and the regenerant ions are the hydroxyl ion and the hydrogen ion.

20. A process as defined in claim 19, wherein said electrical potential is established by an anode and a cathode and a direct current applied across said electrodes and said ion exchange material is particulate and separated from said anode by an anion exchange membrane and from said cathode by a cation exchange membrane to form a bed of modified particulate ion exchange material.

21. A process as defined in claim 20, wherein undesirable anions pass from said bed through said anion exchange material into said cathode chamber and undesirable cations pass from said bed through said cation exchange material into said anode chamber.

22. A process as defined in claim 21, wherein said undesirable anions are flushed from said cathode chamber and said undesirable cations are flushed from said anode chamber.

23. A process as defined in claim 15, wherein the ion exchange material is layers of cation exchange material and anion exchange material, free radical hydroxyl is formed in the cation layers and free radical hydrogen is formed in the anion layers, and the regenerant ions are the hydroxyl ion and the hydrogen ion.

24. A process as defined in claim 15, wherein said electrical potential is established by an anode and a cathode and a direct current applied across said electrodes.

25. A process as defined in claim 24, wherein said direct current is applied in a bipolar fashion.

26. A process as defined in claim 15 and further including the step of recovering the purified aqueous solution.

27. A process as defined in claim 15, wherein free radicals generated in said ion exchange material decompose to their respective ions when said undesirable ions are depleted in said aqueous solution.

28. A process as defined in claim 15, wherein said portion of the total ion exchange sites converted to semiconductor junctions is between 1% and 95%.

29. A process as defined in claim 28, wherein said portion is between 10% and 50%.

30. A process as defined in claim 15, wherein said ion exchange material includes an additive in addition to said modified ion exchange material.

31. An electrolytic process for adjusting pH of aqueous solution, comprising:

passing an aqueous feed solution through an ion exchange material having a portion of its total ion exchange sites converted to semiconductor junctions;

applying a direct current across an anode and a cathode causing regenerant ions to be formed at the semiconductor junctions; and contacting said aqueous solution with said ion exchange material for a time sufficient to cause said regenerant ions to pass into said aqueous solution and adjust the pH of said solution.

32. A process as defined in claim 31, wherein said ion exchange material is separated from said anode and said cathode.

33. A process as defined in claim 31, wherein the ion exchange material is a cation exchange material, the regenerant ion is hydrogen ion and the pH of the aqueous solution is reduced.

34. A process as defined in claim 31, wherein the ion exchange material is an anion exchange material, the regenerant ion is hydroxyl ion and the pH of the aqueous solution is increased.

35. A process as defined in claim 31, wherein said electrical potential is established by an anode and a cathode and said modified ion exchange material is particulate and forms a bed between said anode and cathode.

36. A process as defined in claim 35, wherein said bed of modified particulate ion exchange material is separated from said anode and cathode.

37. A process as defined in claim 31, wherein said portion of the total ion exchange sites converted to semiconductor junctions is between 1% and 95%.

38. A process as defined in claim 37, wherein said portion is between 10% and 50%.

39. A process as defined in claim 31, wherein said ion exchange material includes an additive in addition to said modified ion exchange material.

40. An ion exchanger capable of self-regeneration which comprises particulate ion exchange material for treatment of an aqueous stream, said material having a portion of its total ion exchange sites converted to semiconductor junctions, wherein said portion of the total ion exchange sites converted to semiconductor junctions is between 1% and 95% and an electrolytic circuit with an anode and a cathode to electrolytically regenerate said material by means of said semiconductor junctions.

41. The ion exchanger as defined in claim 40, wherein said material is separated from at least one said electrode with an ion exchange membrane or diaphragm.

42. The ion exchanger as defined in claim 40, wherein said material is separated from both electrodes with an ion exchange membrane or diaphragm.

43. The ion exchanger as defined in claim 40, wherein said portion is between 10% and 50%.

44. The ion exchanger as defined in claim 40, wherein said ion exchange material includes an additive in addition to said modified ion exchange material.

45. An electrolytic process for adjusting a pH of an aqueous solution, the electrolytic process comprising:

passing an aqueous feed solution through an ion exchange material having semiconductor junctions;

applying a direct current across an anode and a cathode to form regenerant ions; and adjusting the pH of said solution by contacting said aqueous solution with said regenerant ions.

46. An ion exchanger comprising:

particulate ion exchange material having semiconductor junctions, wherein an amount of said semiconductor junctions is between 1% and 95% of a total number of ion exchange sites in said particulate ion exchange material; and an electrolytic circuit with an anode and a cathode.

* * * * *